Oct. 22, 1929. G. A. ROBERTSHAW 1,732,538
THERMOSTAT
Filed Sept. 2, 1926
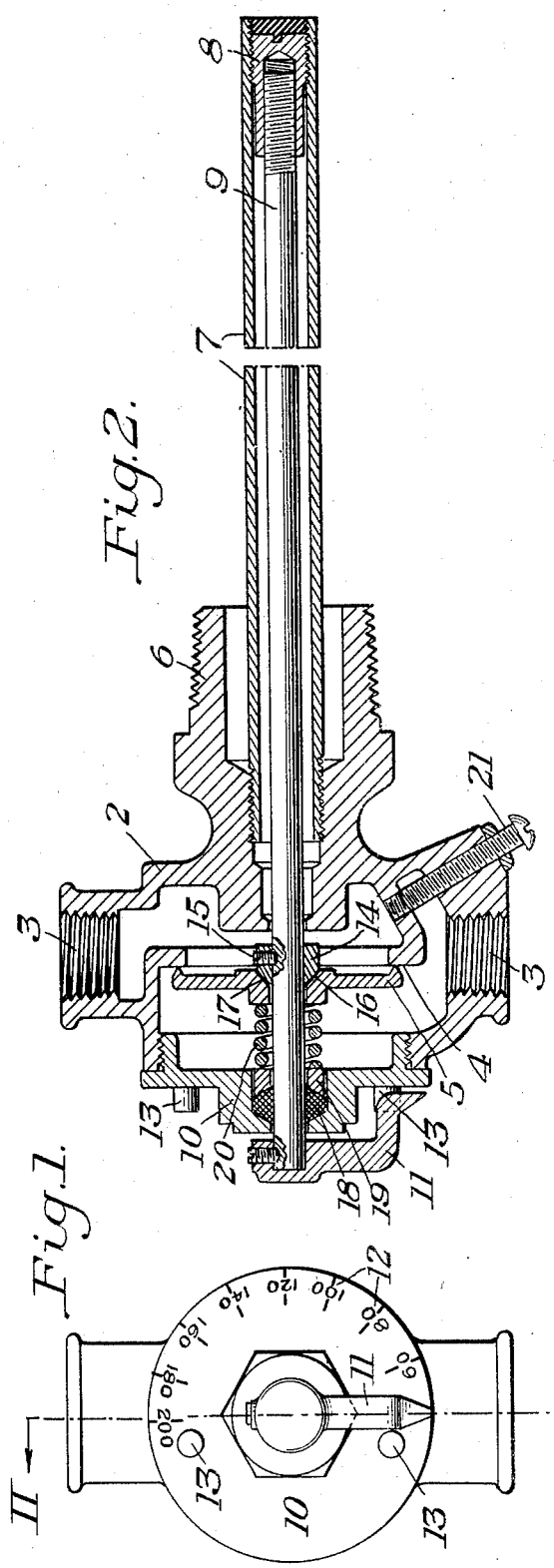
INVENTOR
George A. Robertshaw Patented Oct. 22, 1929

1,732,538

UNITED STATES PATENT OFFICE

GEORGE A. ROBERTSHAW, OF GREENSBURG, PENNSYLVANIA

THERMOSTAT

Application filed September 2, 1926. Serial No. 133,162.

The present invention relates broadly to controlling valve structures, particularly adapted for combustible gases or fluids, and more especially to a valve of the thermostatically controlled type automatically responsive to temperature variations.

It is quite customary in the art to which the present invention relates to provide thermostatically operated valves, comprising a suitable casing containing inlet and outlet openings, the flow between which is controlled by a valve normally urged in one direction by a spring, and in the opposite direction by a heat responsive means. With all such constructions considerable difficulty has been encountered in attempting to obtain a gas-tight structure and in providing efficient means not only for adjusting the temperature at which the thermostat becomes operative, but for effecting re-calibration in the event of error in the original setting of the thermostat.

The present invention has for one of its objects, the provision of an improved thermostatic valve structure in which setting of the thermostat for any desired temperature may be easily made.

Another object of the invention is to provide an improved thermostat in which correction for error in the original setting may easily be made.

Still another object is to provide an improved thermostatic structure embodying a novel form of inexpansible element and sealing means for the valve.

In the accompanying drawings there are shown for purposes of illustration only, certain preferred embodiments of the present invention, it being understood that the drawings do not define the limits of my invention, as changes in the construction and operation disclosed therein may be made, departing neither from the spirit of the invention nor the scope of my broader claims.

In the drawings,

Figure 1 is an end elevation of one form of valve constructed in accordance with the present invention;

Figure 2 is a longitudinal sectional view on the line II—II of Figure 1;

Figure 3 is an end elevation of a modified embodiment of the invention;

Figure 4 is a sectional view through the modification of Figure 3;

Figure 5 is a view similar to Figure 4, showing still a further embodiment, and

Figure 6 is a view similar to Figure 5, illustrating another form of the invention.

In carrying out the present invention there may be provided a valve casing 2 of suitable construction, having threaded openings 3 therein, for connection with inlet and outlet pipes, and having a valve seat 4 for a control valve 5.

The casing may be provided with a threaded extension 6 by means of which the structure may be threaded into operative relation with respect to the device, the temperature of which it is desired to control. Extending through the projection 6 is a tubular expansible member 7 having mounted in its free end a plug 8. This plug 8 has an interiorly threaded recess adapted to receive one end of a nonexpansible member 9. While any desired material may be utilized for either of these members, the member 9 is preferably constructed of metal similar to invar, having an extremely low coefficient of expansion.

The present invention differs fundamentally from thermostatic structures with which I am familiar in that the member 9 extends continuously through the valve 5 and through the cap 10, enclosing the valve chamber, and has at its outer end a pointer 11 co-operating with suitable graduations 12 on the cap. The movement of the pointer 11 may be definitely limited by stops 13.

For transmitting operating pressure from the member 9 to the valve 5, it is provided at a point intermediate its length with a collar 14, secured in position in any desired manner, by a set-screw 15. This collar preferably has a rounded pressure transmitting face 16 co-operating with the inclined walls 17 on the valve. By reason of this construction, the valve may assume different angular positions relatively to the member 9, and thereby find a true seat at all times. A collar of the character described also enables adjustment at will, as may be necessary to properly co-operate with the valve.

The casing may be effectively sealed against leakage in any desired manner, as by suitable packing 18 and packing gland 19. The packing may be normally compressed by a compression spring 20 which is also effective against the valve 5 for normally urging it into closed position.

As is customary in the art, the valve may be provided with a by-pass controlling screw 21 of any usual construction.

With a valve of the character referred to, adjustment of the pointer 11 will have the effect of changing the relation between the member 9 and the plug 8, which in turn occupies a fixed position with respect to the expansible member 7. In this manner easy adjustment of the thermostat for different temperatures is obtained.

By reason of the continuous extension of the member 9 from end to end of the structure, continuously through the valve and beyond the end of the cap, the problem of sealing the valve casing is made comparatively easy. This is true for the reason that during expansion and contraction of the member 7, considerable force is developed which is effective for moving the rod 9 against the resistance of a substantial packing pressure.

In Figures 3 and 4 there is illustrated a slightly modified embodiment of this invention. The cap 10′ in this embodiment carries a dial 22 which is adjustably connected thereto by any desired means, as by a set-screw 23. The dial may carry stop pins 13′ corresponding to the pins before referred to. In the event correction is necessary, the screw 23 may be loosened and the dial adjusted in one direction or the other relatively to the cap 10′. With such a construction the pointer 11′ may be permanently or immovably secured in position on the outer end of the nonexpansible member 9.

In Figure 5 there is illustrated another form of the invention in which the cap has a threaded extension 24 through which the outer end of the member 9 projects. It may be provided with a slot 25 or other means adapted for co-operation with a special tool, whereby the thermostat may be set for different predetermined temperatures. The end of the member 9 may be closed against injury or tampering by a suitable cap 26.

Figure 6 shows still another form of the invention in which the packing 18′ is fixed into position by a threaded gland 19′. The rod or member 9 extends through the packing and has a shaped outer end 27 permitting adjustment thereof.

With all of the forms of the invention herein disclosed, there is provided a highly efficient, extremely simple sealing means in the form of an ordinary stuffing box. This constitutes one of the advantages of the present invention.

Another advantage of the present invention arises from the simple means provided for effecting adjustment within a limited range, or for changing the calibration or temperature setting where such an operation becomes necessary.

Still another, and extremely important advantage of the invention arises not only by reason of the inexpensiveness of the structure provided and its extreme simplicity, but by reason of the extension of one of the operating members completely through the valve.

A still further advantage of the present invention arises from the provision of a valve operating means in the form of a thrust collar adjustably secured on the nonexpansible member and co-operating with the valve in such manner that relative movement of the valve for the purpose of a true seating thereof is made possible.

I claim:—

1. In a thermostatic valve structure, a valve casing, a valve therein, a seat for said valve, and temperature responsive means for operating said valve, said temperature responsive means comprising a member extending completely through the valve and provided with means to give such engagement with the valve as to insure bodily movement of the entire valve toward and away from its seat while permitting relative angular movement between the valve and said member to insure true seating regardless of misalignment of the seat and while preventing lateral movement thereof.

2. In a thermostatic valve structure, a valve casing, a valve therein, a seat for said valve, and temperature responsive means for operating said valve, said temperature responsive means comprising a member extending completely through the valve and provided with means to give such engagement with the valve as to insure bodily movement of the entire valve toward and away from its seat while permitting relative angular movement between the valve and said member to insure true seating regardless of misalignment of the seat and while preventing lateral movement thereof, there being sealing means for the free end of said member.

3. In a thermostatic valve structure, a valve casing, a valve therein, a seat for said valve, and temperature responsive means for operating said valve, said temperature responsive means comprising a member extending completely through said valve, there being a collar carried by said member for co-operation with the valve, and means for holding said collar in adjusted position lengthwise of said member.

4. In a thermostatic valve structure, a valve casing, a valve therein, a seat for said valve, and temperature responsive means for operating said valve, said temperature responsive means comprising a member extending completely through said valve, there being a collar carried by said member for cooperation with the valve, and means for holding said collar in adjusted position lengthwise of said member, said collar and valve having cooperating surfaces shaped to insure uniform engagement between the collar and valve while permitting relative angular adjustment therebetween.

5. In a thermostatic valve structure, a valve casing, a valve therein, a seat for said valve, and temperature responsive means for operating said valve, said temperature responsive means comprising a member extending completely through said valve, there being a collar carried by said member for cooperation with the valve, and means for holding said collar in adjusted position lengthwise of said member, said collar and valve having cooperating surfaces shaped to insure uniform engagement between the collar and valve while permitting relative angular adjustment therebetween, said collar having a rounded surface freely abutting against said valve.

In testimony whereof I have hereunto set my hand.

GEORGE A. ROBERTSHAW.